July 30, 1968  J. B. DYM  3,394,980
SPECTACLES WITH ADJUSTABLE LENGTH TEMPLES
Filed June 11, 1964
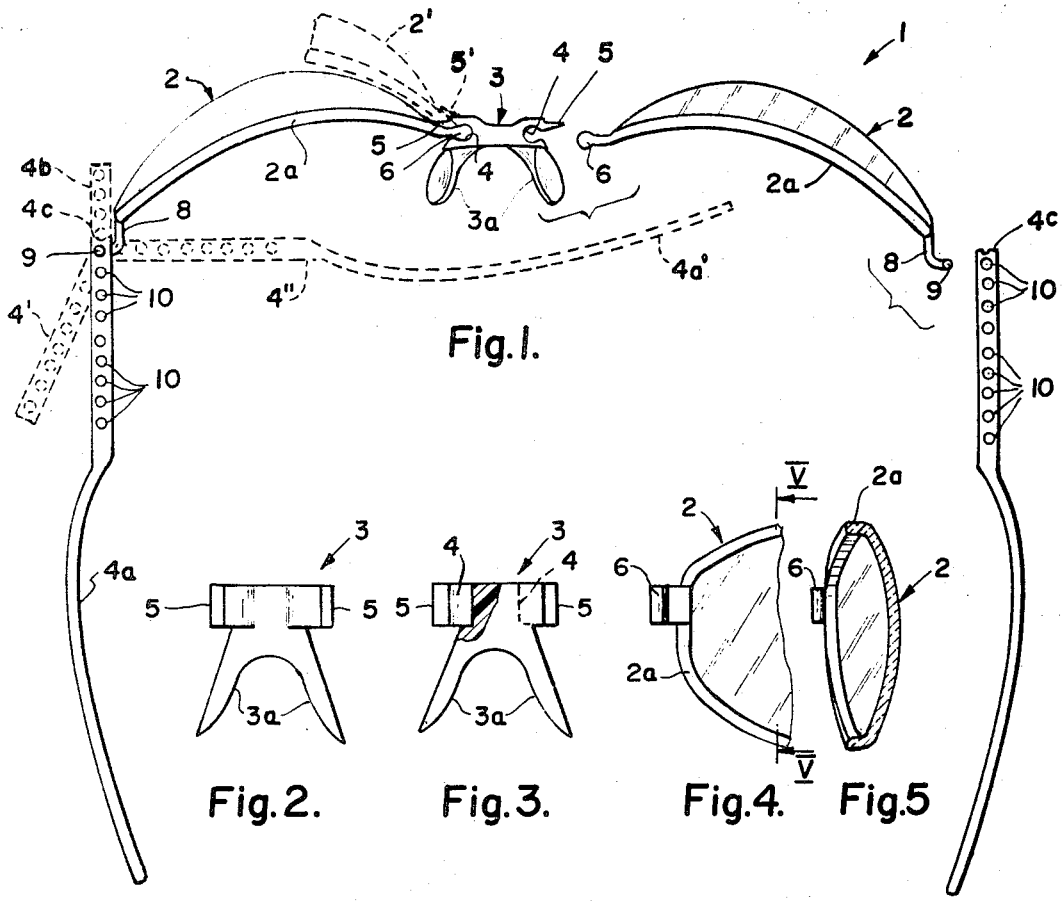
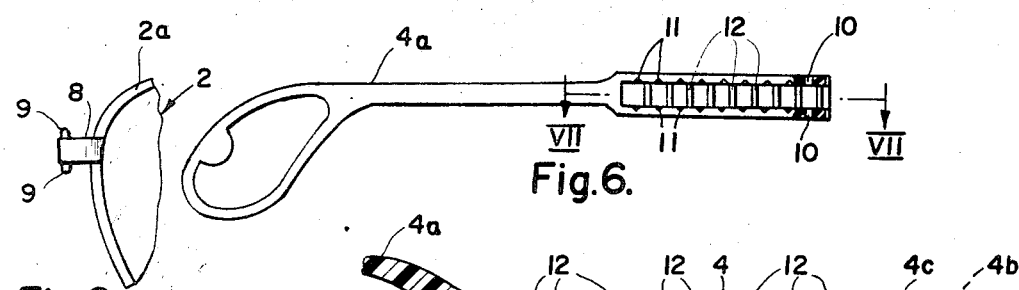
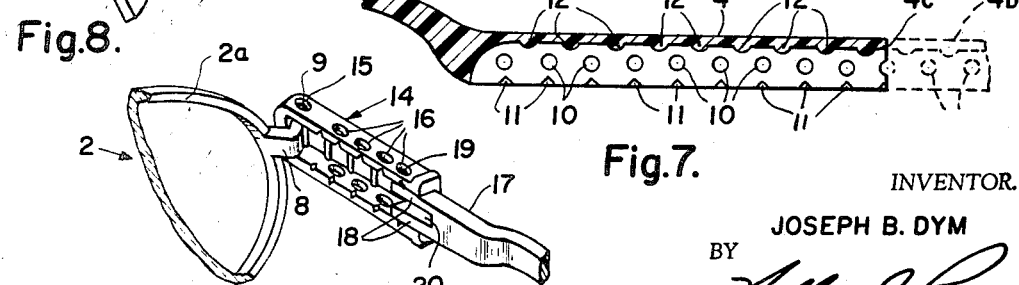
INVENTOR.
JOSEPH B. DYM
BY William J. Ruano
his ATTORNEY

United States Patent Office 3,394,980
Patented July 30, 1968

3,394,980
SPECTACLES WITH ADJUSTABLE LENGTH TEMPLES
Joseph B. Dym, Pittsburgh, Pa., assignor to Safemaster, Inc., Homestead, Pa.
Filed June 11, 1964, Ser. No. 374,472
2 Claims. (Cl. 351—41)

ABSTRACT OF THE DISCLOSURE

Adjustable sunglasses in which the nose piece is attached by snap action to pivots on the rims of the lenses and in which a plurality of pairs of registering holes are provided in the forward portion of each temple of U-shaped cross-section, which pairs of holes are selectively connected by snap action to pivots at the extremities of the lenses to selectively adjust the length of the temples. By such construction, the plastic sunglasses may be easily and quickly adjusted by the ordinary user to fit his facial contour.

---

This invention relates generally to spectacles and, more particularly, to self-fitting sunglasses.

In the past, many attempts have been made to provide some adjustability in spectacles, such as sunglasses, but these have not been found to be completely satisfactory since the adjustability involved has never been sufficient to cover all types of persons, that is widely varying face sizes, nose sizes, nasal contours, etc.

Still another disadvantage has been that the adjustable features have involved discomfort in wear, such as from pivoting of two lenses together, which provide a vise-like arrangement which pinches the nose and which brings the lenses at an angle of considerably less than 180°, which, in turn, brings the lenses at too great an angle with respect to the line of sight.

An object of the present invention is to provide a novel pair of sunglasses, or other safety spectacles, involving separable parts enabling various adjustments so that by stocking of very few parts, sunglasses may be made to fit all face and nasal sizes and contours of the wearer, which adjustments can be made easily and quickly by the average unskilled worker.

A further object of the invention is to provide an adjustable sunglass wherein the parts fit together in a manner so as to provide considerable comfort in wear and so that replacements can be easily and quickly done in the field, merely by carrying relatively few spare parts.

Other objects and advantages will become more apparent from a study of the following description taken with the accompanying drawing wherein:

FIG. 1 is a top view, with some of the parts shown exploded, of a pair of sunglasses embodying the principles of the present invention;

FIG. 2 is a rear view of the nose piece 3;

FIG. 3 is a view similar to FIG. 2 but showing a portion in cross-section;

FIG. 4 is a fragmentary, rear view of the lens and pin element 6 adapted to fit into the socket 4 of the nose piece;

FIG. 5 is a cross-sectional view taken along line V—V of FIG. 4;

FIG. 6 is an inside view of one of the temples shown in FIG. 1;

FIG. 7 is an enlarged, cross-sectional view taken along line VII—VII of FIG. 6;

FIG. 8 is a fragmentary, front view of one of the lenses provided with a pivotal connector element 8 which is adapted to be selectively fitted into one of the pairs of holes 10 shown in FIGS. 1, 6 and 7; and FIG. 9 is a fragmentary, perspective view of a modified adjustable temple.

Referring more particularly to FIG. 1 of the drawing, numeral 1 generally denotes a pair of sunglasses (or other safety type spectacles or goggles) provided with lenses, generally denoted by numeral 2, each of which has a pin or pivotal element 6 of somewhat cylindrical shape which is adapted to be wedged into cylindrical grooves or sockets 4 of nosepiece 3 after the pin wedges apart the wing 5 or 5′ and its opposed wing portion emanating from the narrowest constriction of the socket 4, due to springiness of the plastic material from which the nosepiece 3 is made. This material may be nylon or other suitable plastic material. It should be noted that all parts of the spectacles, including temples 4, may be made of the same plastic material.

The nose piece 3 is provided with a nose pad portion 3a which is smoothly curved to provide a comfortable fit with the nose. It should be particularly noted that the nose piece 3 has appreciable width, so that any pivotal movement of pins 6 in the sockets 4 through the angular range indicated by dotted line 2′, will not pinch the nose, that is, the nose pads 3a retain their comfortable fit and normal separation irrespective of pivotal adjustment of the lenses relative thereto.

Obviously lenses 2 of different width or size may be substituted to provide the proper spacing between nosepiece 3 and temples 4a for different face sizes of the wearer. At the extremities of lenses 2 there are provided integral lugs or extensions 8 terminating in pivots 9 which are adapted to be selectively fitted into different pairs of holes 10 formed in the forward portion of the temples 4 of U-shaped cross section. This is done by inclining pivots 9 with respect to the channel-like openings in the temple, that is, extending each of the pivots 9 parallel to the temple until it fits in the channel and then turning the pivots 9 to a vertical position so that they will snap into a pair of vertically aligned holes 10 and in so doing they will spring apart the top and bottom walls or legs of the U which bear these holes 10 in view of their slight flexibility.

After the temples have been fitted to the individual wearer to provide a comfortable fit, a portion 4b of the temple 4a will project forwardly of the lenses, as shown in dash lines in FIGS. 1 and 7, which portion may be easily broken off at 4c by either breaking by hand, or better still, by slitting by means of a knife along notches 11 between vertical beads 12. Thus the temples may be made of selective length to suit the individual wearer and only one construction and size of temples may be used to fit all wearers. Temple 4a may be pivoted outwardly to 4′ or inwardly to 4″, the latter when the temple is folded to position 4a′.

FIG. 9 shows a modification of the temple of adjustable length which does not require cutting off of the front portion and denoted generally by numeral 14. The front portion 15 is permanently pivoted by pivots 9 and the rear portion 17 having a central opening 20 to provide a bifurcated element whose prongs 18 may be sprung together and pins 19 fitted into the groove of portion 15 and then allowed to spring apart whereupon the lateral integral projections thereon (not shown but similar to 9) may be selectively inserted in any pair of grooves 16 so as to provide adjustable length.

It will be noted from FIGS. 5 and 9 that the rim has an integral bead 2a projecting substantially at right angles thereto which is slightly rounded to provide a comfortable fit against the cheeks of the wearer should they came into contact therewith. The lens rim and bead may be of polycarbonate, also the other parts.

Thus it will be seen that I have provided an efficient pair of sunglasses which provides close fitting of the lenses and a very wide range of adjustment and is comprised of easily adjustable parts, which may be easily and quickly attached or detached, and which sunglasses may be self-fitted by unskilled persons on the job site; furthermore, I have provided a pair of adjustable sunglasses or safety spectacles in which a minimum number of separable parts is required, and in which the same nose piece and temple may be used by all wearers, the major adjustment being the substitution of one size of lens for another, so as to provide an extremely comfortable fit with minimum inventory requirements.

While I have illustrated and described several embodiments of my invention, it will be understood that these are by way of illustration only, and that various changes and modifications may be made within the contemplation of my invention and within the scope of the following claims.

I claim:

1. A pair of adjustable spectacles including lenses having vertically extending pivots at the outer extremities, a pair of temples of plastic material provided with a forward extremity of U-shaped cross-section wherein the legs of the U are flexible and are provided with a plurality of registering pairs of spaced holes in vertical registry extending along the length of the temples, said pivots being selectively insertable into a pair of said registering holes by snap action after flexing said legs, and a plurality of weak points provided along the legs of said forward extremity to facilitate breaking off of the extension of the temple extending forwardly of the lenses after adjustment has been made.

2. A pair of adjustable spectacles as recited in claim 1, including a nose piece having a pair of sockets on the respective sides thereof, a pair of lenses, each having an integral pin-like portion which is adapted to be snap-fitted into one of said sockets, each socket having a wing-like stop element of less thickness than said pin-like portion allowing a limited pivotal adjustment of the lens in angularity with respect to the nose piece.

References Cited

UNITED STATES PATENTS

| | | | |
|---|---|---|---|
| 766,413 | 8/1904 | Bloch | 351—116 |
| 1,099,404 | 6/1914 | Spery | 351—116 X |
| 1,871,183 | 8/1932 | King | 351—128 X |
| 1,925,960 | 9/1933 | Guilmette | 351—63 |
| 2,065,935 | 12/1936 | Grossman | 351—128 |
| 2,426,266 | 8/1947 | Haas | 2—14 |
| 2,443,249 | 6/1948 | Jackson | 287—58 |
| 2,640,391 | 6/1953 | Moseley | 351—128 |
| 3,052,161 | 9/1962 | Berend | 351—118 |
| 3,261,652 | 7/1966 | Magnus | 351—118 |

FOREIGN PATENTS 434,786  5/1948  Italy.

DAVID H. RUBIN, *Primary Examiner.*

J. W. LEONARD, *Assistant Examiner.*